(12) United States Patent
Mellet et al.

(10) Patent No.: US 8,961,350 B1
(45) Date of Patent: Feb. 24, 2015

(54) CONTINUOUSLY VARIABLE TRANSMISSION WITH CHAIN OUTPUT

(71) Applicant: GM Global Technology Operations LLC, Detroit, MI (US)

(72) Inventors: Edward W. Mellet, Rochester Hills, MI (US); Daryl A. Wilton, Macomb, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/031,636

(22) Filed: Sep. 19, 2013

(51) Int. Cl.
*F16H 37/02* (2006.01)
*F16H 3/44* (2006.01)

(52) U.S. Cl.
CPC . *F16H 37/02* (2013.01); *F16H 3/44* (2013.01)
USPC .......................................................... 475/210

(58) Field of Classification Search
None
See application file for complete search history.

(56) References Cited

U.S. PATENT DOCUMENTS

| | | | | |
|---|---|---|---|---|
| 4,644,820 A | * | 2/1987 | Macey et al. | 475/211 |
| 5,803,858 A | * | 9/1998 | Haka | 475/210 |
| 5,803,859 A | * | 9/1998 | Haka | 475/211 |
| 5,827,146 A | * | 10/1998 | Yan et al. | 475/210 |
| 5,931,760 A | * | 8/1999 | Beim et al. | 475/211 |
| 5,937,711 A | * | 8/1999 | McCarrick et al. | 74/665 GE |
| 6,093,125 A | * | 7/2000 | McCarrick et al. | 475/210 |
| 6,210,298 B1 | * | 4/2001 | Baur et al. | 475/211 |
| 6,293,888 B1 | * | 9/2001 | Moon | 475/210 |
| 6,447,422 B1 | * | 9/2002 | Haka | 475/211 |
| 8,579,753 B2 | | 11/2013 | Heitzenrater et al. | |
| 2008/0261766 A1 | * | 10/2008 | Koyama et al. | 475/280 |
| 2013/0130859 A1 | | 5/2013 | Lundberg et al. | |
| 2013/0324355 A1 | | 12/2013 | Xie et al. | |
| 2013/0333508 A1 | | 12/2013 | Lundberg et al. | |
| 2014/0038761 A1 | | 2/2014 | Xu | |

* cited by examiner

*Primary Examiner* — Dirk Wright

(57) ABSTRACT

A continuously variable transmission for a motor vehicle includes an input member, an output member, a first planetary gear set having first, second, and third members, wherein the first member is interconnected with the input member, a brake connected to the second member of the first planetary gear set, a clutch interconnected between one of the first member, second member, and third member of the first planetary gear set and another one of the first member, second member, and third member of the first planetary gear set, a belt and pulley assembly connected to the third member of the first planetary gear set and the output member, a chain drive interconnected to the output member, and a final drive unit interconnected to the chain drive.

20 Claims, 4 Drawing Sheets

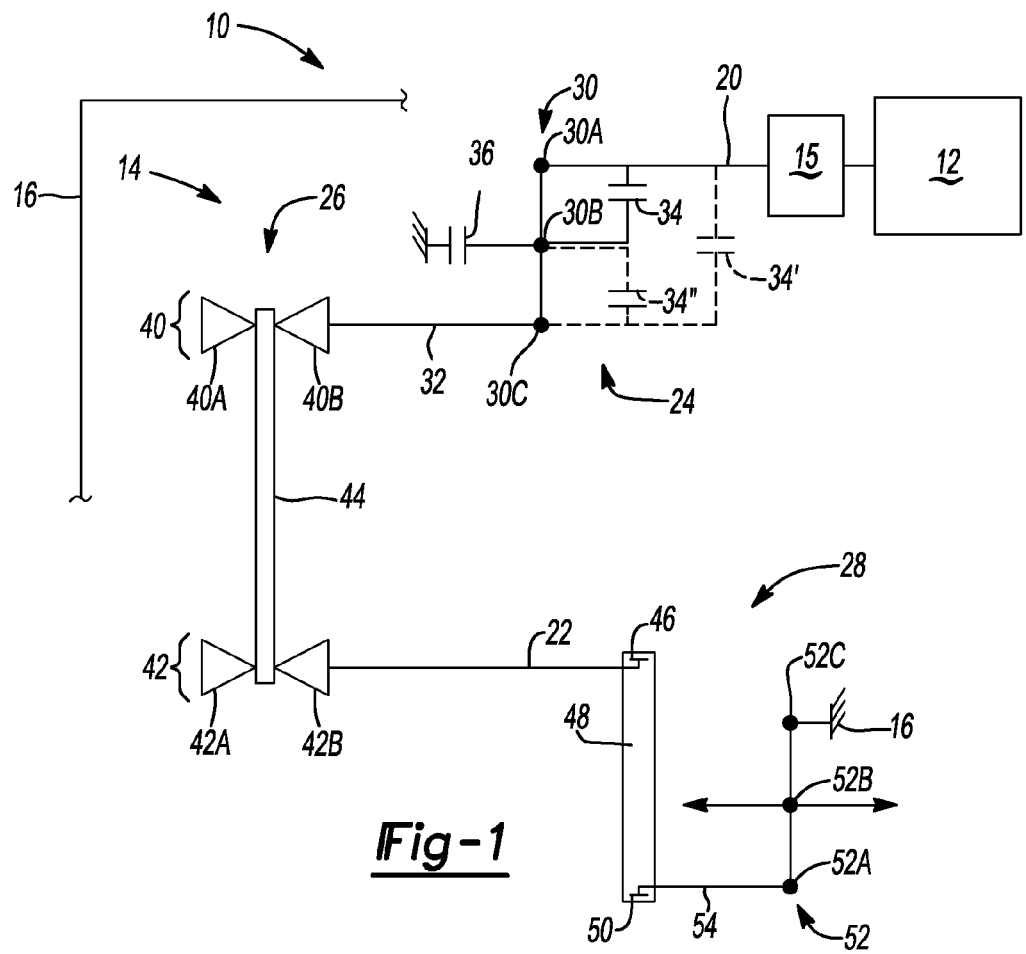
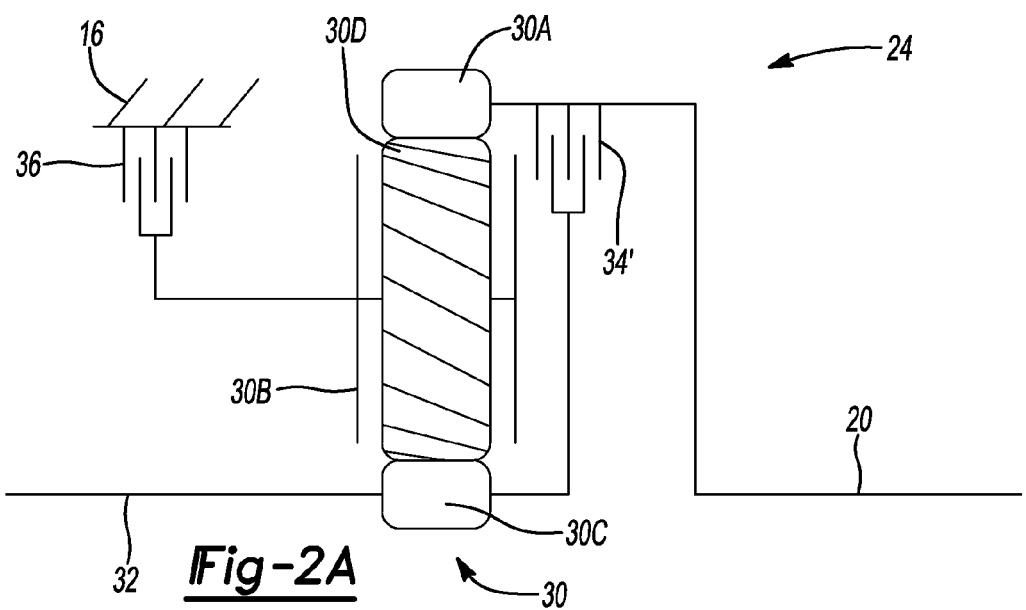

CONTINUOUSLY VARIABLE TRANSMISSION WITH CHAIN OUTPUT

FIELD

The present disclosure relates to automatic transmissions and more particularly to a continuously variable transmission having a chain driven output.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

CVT axial length and mass significantly impact its power density and efficiency. Accordingly, there is a constant need for improved CVT designs that minimize axial length and mass while providing sufficient performance characteristics.

SUMMARY

A continuously variable transmission for a motor vehicle is provided. The CVT includes an input member, an output member, a first planetary gear set having first, second, and third members, wherein the first member is interconnected with the input member, a brake connected to the second member of the first planetary gear set, a clutch interconnected between one of the first member, second member, and third member of the first planetary gear set and another one of the first member, second member, and third member of the first planetary gear set, a belt and pulley assembly connected to the third member of the first planetary gear set and the output member, a chain drive interconnected to the output member, and a final drive unit interconnected to the chain drive.

In one embodiment of the present invention, engagement of the brake provides a Reverse speed ratio and engagement of the clutch provides a forward speed ratio.

In another embodiment of the present invention, the clutch is selectively engageable to connect the first member of the first planetary gear set with the second member of the first planetary gear set.

In another embodiment of the present invention, the clutch is selectively engageable to connect the first member of the first planetary gear set with the third member of the first planetary gear set.

In another embodiment of the present invention, the clutch is selectively engageable to connect the second member of the first planetary gear set with the third member of the first planetary gear set.

In another embodiment of the present invention, the first member of the first planetary gear set is a ring gear, the second member of the first planetary gear set is a carrier member, and the third member of the first planetary gear set is a sun gear.

In another embodiment of the present invention, the final drive unit includes a second planetary gear set having a first member, a second member, and a third member, wherein the first member is interconnected to the chain drive and the third member is fixed for rotation to a stationary member.

In another embodiment of the present invention, the first member of the second planetary gear set is a sun gear, the second member of the second planetary gear set is a carrier member, and the third member of the second planetary gear set is a ring gear.

In another embodiment of the present invention, the brake is a band brake.

In another embodiment of the present invention, the band brake, the output member, and the final drive unit are each disposed on separate, parallel axes of rotation, and the transmission includes a transmission housing which cooperates with the band brake to define a space adjacent the band brake and radially inwards of the transmission housing, and the chain drive is at least partially disposed within the space when the transmission is operating.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

FIG. 1 is a schematic diagram of a powertrain according to the principles of the present invention;

FIG. 2A is a is a diagrammatic illustration of an embodiment of a gear set according to the principles of the present invention;

DETAILED DESCRIPTION

Figure 2B:
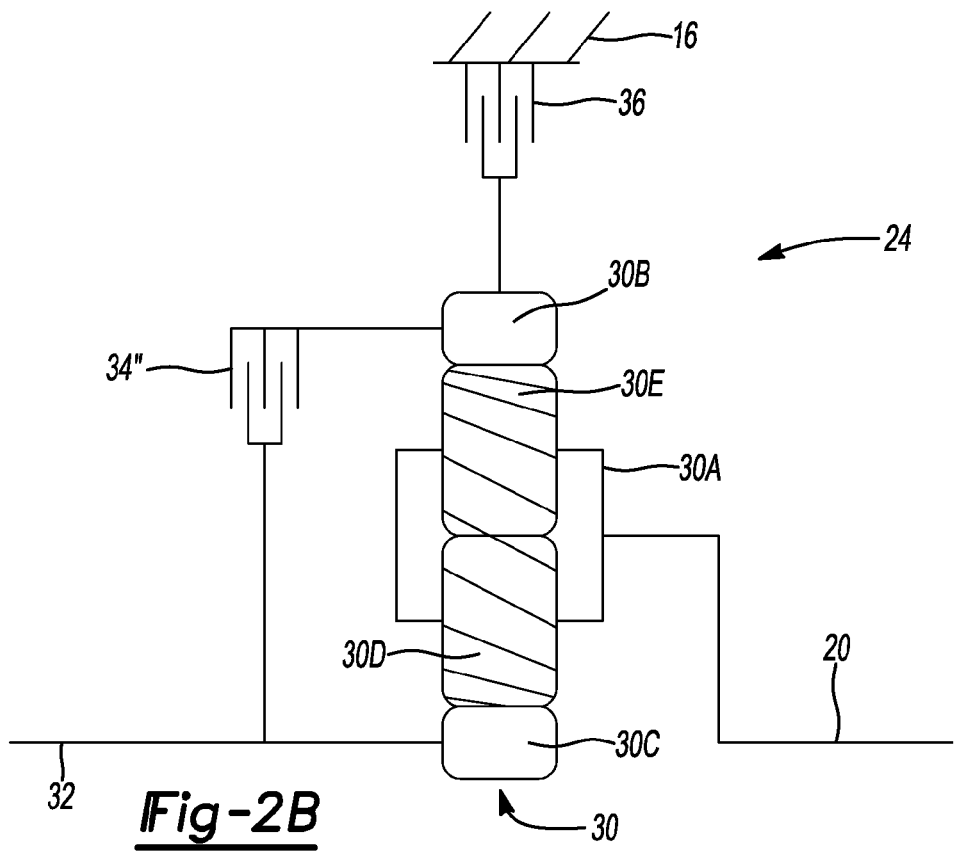
FIG. 2B is a is a diagrammatic illustration of an embodiment of a gear set according to the principles of the present invention.

The following description is merely exemplary in nature and is not intended to limit the present disclosure, application, or uses.

With reference to FIG. 1, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a flexplate (not shown) or other connecting device or a starting device 15 such as a hydrodynamic device or launch clutch.

The transmission 14 is a variable diameter pulley or sheave drive continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft or member 20 and a transmission output shaft or member 22. Connected between the transmission input shaft 20 and the transmission output shaft 22 is a gearbox 24 and pulley assembly 26 that cooperate to provide forward and reverse speed or gear ratios between the transmission input shaft 20 and the transmission output shaft 22. The transmission input shaft 20 is functionally interconnected with the engine 12 through the starting device 15 and receives input torque or power from the engine 12. The transmission output shaft 22 is preferably connected with a chain driven final drive unit 28. The transmission output shaft 22 provides drive torque to the chain driven final drive unit 28.

The transmission input shaft 20 is connected to the gearbox 24. The gearbox 24, as well as a portion of the final drive unit 28, is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the gearbox 24 includes a planetary gear set 30 that includes a first node 30A, a second node 30B, and a third node 30C. The first node 30A is coupled to the transmission input shaft 20. The third node 30C is connected to a transfer shaft or member 32 that is coupled to the pulley assembly 26. A clutch 34 selectively connects the transmission input member 20 and the first node 30A of the planetary gear set 30 with the second node 30B of the planetary gear set 30. A brake 36 selectively connects the second node 30B of the planetary gear set 30 to a stationary member or the transmission housing 16. The brake 36 is preferably a band brake in order to minimize axial space, as will be discussed in greater detail below. In a preferred embodiment, the first node 30A corresponds to a ring gear, the second node 30B corresponds to a planet carrier member, and the third node 30C corresponds to a sun gear. In an alternate embodiment, the clutch 34 is replaced by a clutch 34', indicated by dashed lines in FIG. 1. The clutch 34' selectively connects the transmission input member 20 and the first node 30A of the planetary gear set 30 with the third node 30C of the planetary gear set 30. In another alternate embodiment, the clutch 34 is replaced by a clutch 34", indicated by dashed lines in FIG. 1. The clutch 34" selectively connects the second node 30B of the planetary gear set 30 with the third node 30C of the planetary gear set 30. By engaging the clutch 34, the gearbox 24 transfers engine torque to the transfer shaft 32 and the pulley assembly 26 in a forward speed ratio. By engaging the brake 36 with the clutch 34, the gearbox 24 transfers the engine torque to the transfer shaft 32 and the pulley assembly 26 in a reverse speed ratio.

Turning to FIGS. 2A-D, stick diagrams present schematic layouts of embodiments of the gearbox 24 according to the present invention. In FIGS. 2A-D the numbering from the lever diagram of FIG. 1 are carried over. The clutches and couplings are correspondingly presented whereas the nodes of the planetary gear sets now appear as components of planetary gear sets such as sun gears, ring gears, planet gears and planet gear carriers.

For example, in FIG. 2A, the gear set 30 includes a ring gear member 30A, a planet carrier member 30B, and a sun gear member 30C. The planet carrier member 30B rotatably supports a set of planet gears 30D (only one of which is shown). The planet gears 30D are each configured to intermesh with both the ring gear member 30A and the sun gear member 30C. The sun gear member 30C is connected for common rotation with the transfer shaft 32 and to the clutch 34'. The planet carrier member 30B is connected to the brake 36. The ring gear member 30A is connected for common rotation with the input shaft 20 and the clutch 34'. The clutch 34' is selectively engageable to connect the transfer shaft 32 and the sun gear 30C with the input shaft 20 and the ring gear 30A. The brake 36 is selectively engageable to connect the carrier member 30B with the transmission housing 16 in order to restrict relative rotation of the carrier member 30B.

In FIG. 2B, the gear set 30 is a compound planetary gear set and includes a ring gear member 30B, a planet carrier member 30A, and a sun gear member 30C. The planet carrier member 30A rotatably supports a set of planet gears 30D (only one of which is shown) and 30E (only one of which is shown). The planet gears 30D are each configured to intermesh with both the sun gear member 30C and the planet gears 30E. The planet gears 30E are configured to intermesh with both the planet gears 30D and the ring gear 30B. The sun gear member 30C is connected for common rotation with the transfer shaft 32 and to the clutch 34". The planet carrier member 30A is connected to the input shaft 20. The ring gear member 30B is connected for common rotation with the clutch 34" and the brake 36. The clutch 34" is selectively engageable to connect the transfer shaft 32 and the sun gear 30C with the ring gear 30B. The brake 36 is selectively engageable to connect the ring gear 30B with the transmission housing 16 in order to restrict relative rotation of the ring gear 30B.

Figure 2C:
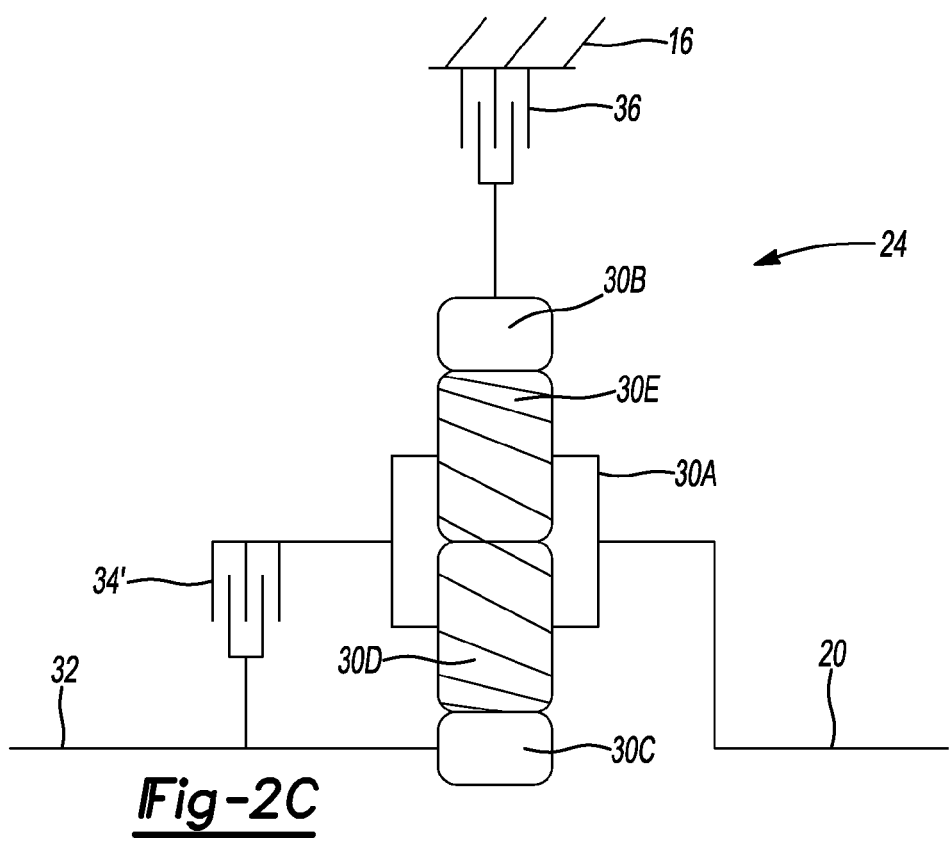
FIG. 2C is a is a diagrammatic illustration of an embodiment of a gear set according to the principles of the present invention.

In FIG. 2C, the gear set 30 is a compound planetary gear set and includes a ring gear member 30B, a planet carrier member 30A, and a sun gear member 30C. The planet carrier member 30A rotatably supports a set of planet gears 30D (only one of which is shown) and 30E (only one of which is shown). The planet gears 30D are each configured to intermesh with both the sun gear member 30C and the planet gears 30E. The planet gears 30E are configured to intermesh with both the planet gears 30D and the ring gear 30B. The sun gear member 30C is connected for common rotation with the transfer shaft 32 and to the clutch 34'. The planet carrier member 30A is connected to the input shaft 20 and the clutch 34'. The ring gear member 30B is connected for common rotation with the brake 36. The clutch 34' is selectively engageable to connect the transfer shaft 32 and the sun gear 30C with the carrier member 30A and the input shaft 20. The brake 36 is selectively engageable to connect the ring gear 30B with the transmission housing 16 in order to restrict relative rotation of the ring gear 30B.

Figure 2D:
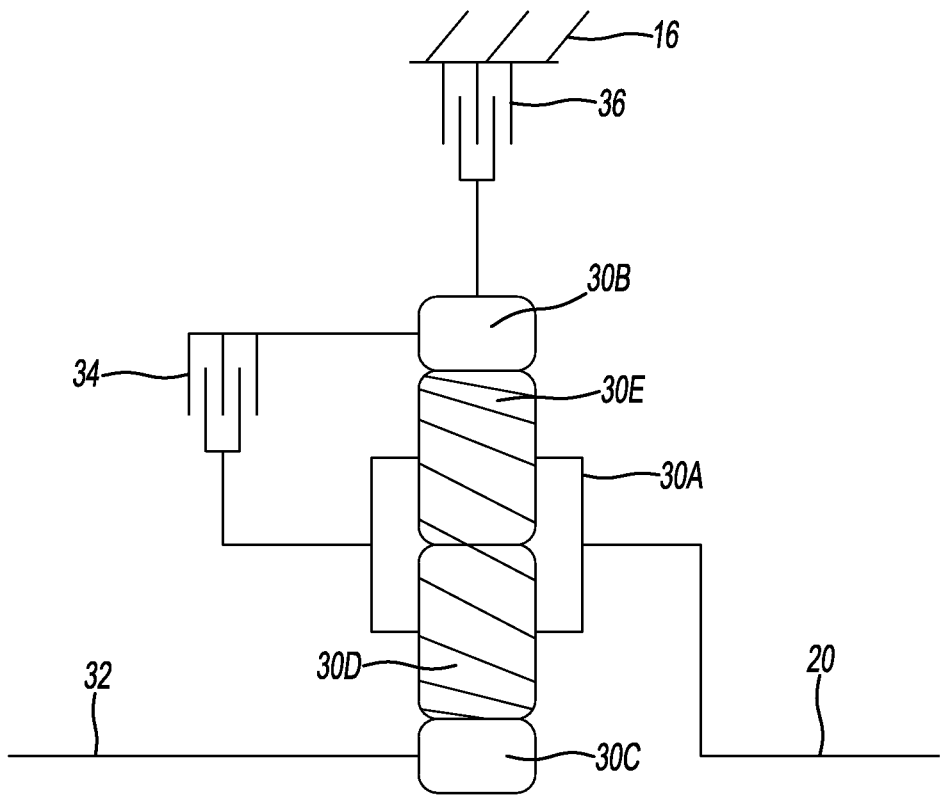
FIG. 2D is a is a diagrammatic illustration of an embodiment of a gear set according to the principles of the present invention.

In FIG. 2D, the gear set 30 is a compound planetary gear set and includes a ring gear member 30B, a planet carrier member 30A, and a sun gear member 30C. The planet carrier member 30A rotatably supports a set of planet gears 30D (only one of which is shown) and 30E (only one of which is shown). The planet gears 30D are each configured to intermesh with both the sun gear member 30C and the planet gears 30E. The planet gears 30E are configured to intermesh with both the planet gears 30D and the ring gear 30B. The sun gear member 30C is connected for common rotation with the transfer shaft 32. The planet carrier member 30A is connected to the input shaft 20 and the clutch 34. The ring gear member 30B is connected for common rotation with the brake 36 and the clutch 34. The clutch 34 is selectively engageable to connect the input shaft 20 and the carrier member 30A with the ring gear 30B. The brake 36 is selectively engageable to connect the ring gear 30B with the transmission housing 16 in order to restrict relative rotation of the ring gear 30B.

Returning to FIG. 1, the pulley assembly 26 includes a first pulley or sheave pair 40 and a second pulley or sheave pair 42. The first pulley 40 includes a first truncated conical sheave or member 40A and second truncated conical sheave or member 40B in axial alignment with the first truncated conical sheave 40A. The second sheave 40B is directly connected for rotation with the transfer member 32 and may be integrally formed with the transfer member 32. The first sheave 40A is moveable axially relative to the second sheave 40B by a hydraulic control system (not shown) or other actuating system. It should be appreciated that the sheaves 40A and 40B may be axially switched without departing from the scope of the present invention.

The second pulley 42 includes a first truncated conical sheave or member 42A and second truncated conical sheave or member 42B in axial alignment with the first truncated conical sheave 42A. The second sheave 42B is directly connected for rotation with the transmission output shaft or member 22 or may be integrally formed with the transmission output shaft or member 22. The first sheave 42A is moveable axially relative to the second sheave 42B by a hydraulic control system (not shown) or other actuating system. It should be appreciated that the sheaves 42A and 42B may be axially switched without departing from the scope of the present invention.

A torque transmitting belt or chain 44 having a V-shaped cross section is mounted between the first pulley pair 40 and the second pulley pair 42. Drive torque communicated from the transfer shaft 32 is transferred via friction between the sheaves 40A and 40B and the belt 44. The ratio of the input pulley 40 to the output pulley 42 is adjusted by varying the spacing between the sheaves 40A and 40B and between the sheaves 42A and 42B. For example, to change the ratio between the pulleys 40 and 42, the axial distance between sheaves 40A and 40B may be reduced by moving sheave 40A towards sheave 42B while simultaneously the axial distance between sheave 42A and 42B may be increased by moving sheave 42A away from sheave 42B. Due to the V-shaped cross section of the belt 44, the belt 44 rides higher on the first pulley 40 and lower on the second pulley 42. Therefore the effective diameters of the pulleys 40 and 42 change, which in turn changes the overall gear ratio between the first pulley 40 and the second pulley 42. Since the radial distance between the pulleys 40 and 42 and the length of the belt 44 is constant, the movement of the sheaves 40A and 42A must occur simultaneously in order to maintain the proper amount of tension on the belt 44 to assure torque is transferred from the pulleys 40, 42 to the belt 44.

The transmission output shaft 22 is interconnected with or includes a first spur gear or drive sprocket 46. A transfer chain or chain drive 48 is engaged or otherwise meshed with the drive sprocket 46 and engaged or otherwise meshed with a second spur gear or driven sprocket 50. The driven sprocket 50 is interconnected with a final drive planetary gear set 52 either directly or via a shaft or member 54.

The final drive planetary gear set 52 includes a first node 52A, a second node 52B, and a third node 52C. The first node 52A is coupled to the driven sprocket 50. The third node 52C is connected to a fixed or stationary member such as the transmission housing 16. The second node 52B is interconnected to other final drive components (not shown) that may include a differential, drive axles, and vehicle road wheels. In a preferred embodiment, the first node 52A corresponds to a sun gear, the second node 52B corresponds to a planet carrier member, and the third node 52C corresponds to a ring gear. The final drive planetary gear set 52 transfers the drive torque from the carrier 52B to the final drive components that includes the differential, axle shafts, and road wheels.

Figure 3A:
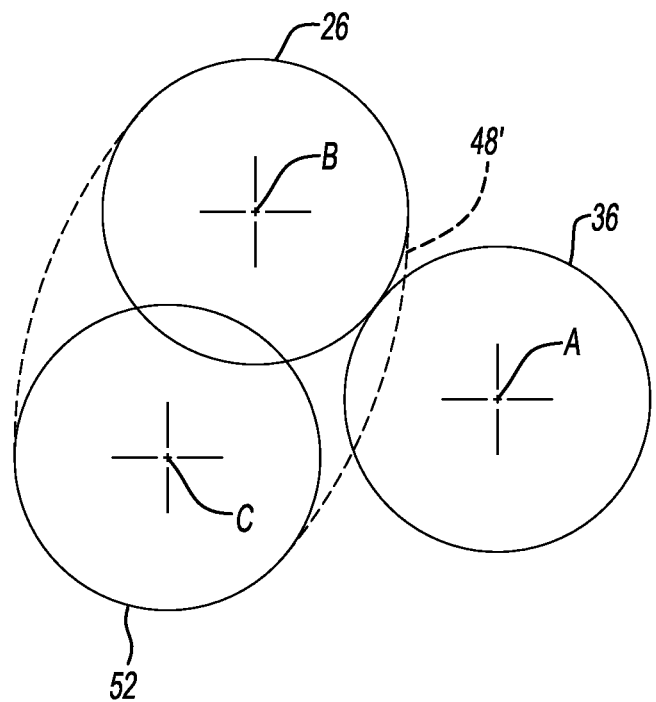
FIG. 3A is a schematic diagram of a front view layout of a transmission of the powertrain.
Figure 3B:
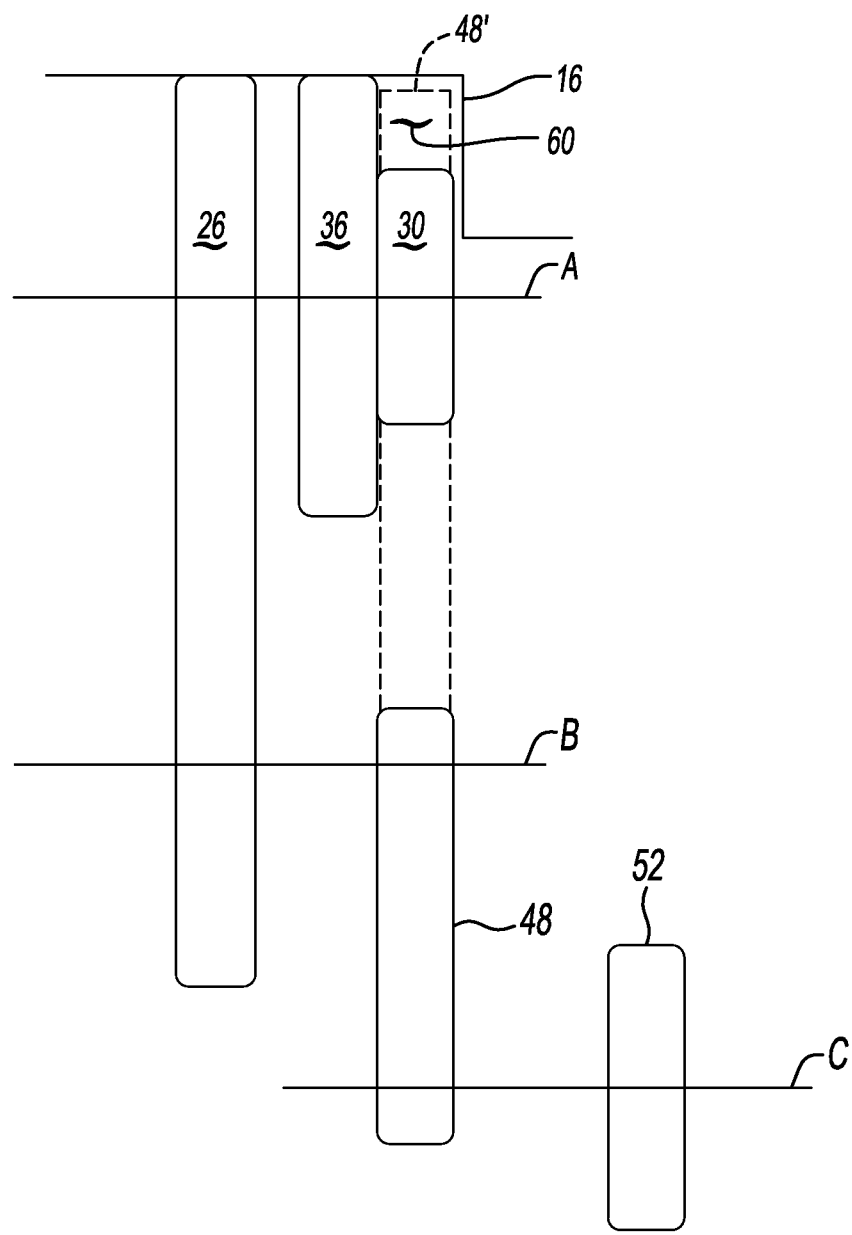
FIG. 3B is a schematic diagram of a side view layout of the transmission.

Turning to FIGS. 3A and 3B, schematic diagrams illustrate the axial and radial layout of the transmission 14 on three primary axes "A", "B", and "C". During operation of the transmission 14, the chain 48 flexes radially outwardly, indicated by dashed lines 48'. As best seen in FIG. 3A, this flexing of the chain 48 radially overlaps the outer diameter of the brake 36. If the brake 36 is a typical plate clutch the chain 48 would not have the space to freely flex since the plate clutch has a relatively large axial presence. However, configuring the brake 36 as a band brake creates an axial space 60 which is defined by the axial end of the brake 36 and the housing 16. This axial space 60 allows the chain 48 to flex into the same radial plane as the brake 36 without contacting the brake 36.

The description of the invention is merely exemplary in nature and variations that do not depart from the gist of the invention are intended to be within the scope of the invention. Such variations are not to be regarded as a departure from the spirit and scope of the invention.

The following is claimed:

1. A continuously variable transmission comprising:
an input member;
an output member;
a first planetary gear set having first, second, and third members, wherein the first member is interconnected with the input member;
a brake connected to the second member of the first planetary gear set;
a clutch interconnected between one of the first member, second member, and third member of the first planetary gear set and another one of the first member, second member, and third member of the first planetary gear set;
a belt and pulley assembly connected to the third member of the first planetary gear set and the output member;
a chain drive interconnected to the output member; and
a final drive unit interconnected to the chain drive.

2. The continuously variable transmission of claim 1 wherein engagement of the brake provides a Reverse speed ratio and engagement of the clutch provides a forward speed ratio.

3. The continuously variable transmission of claim 1 wherein the clutch is selectively engageable to connect the first member of the first planetary gear set with the second member of the first planetary gear set.

4. The continuously variable transmission of claim 1 wherein the clutch is selectively engageable to connect the first member of the first planetary gear set with the third member of the first planetary gear set.

5. The continuously variable transmission of claim 1 wherein the clutch is selectively engageable to connect the second member of the first planetary gear set with the third member of the first planetary gear set.

6. The continuously variable transmission of claim 1 wherein the first member of the first planetary gear set is a ring gear, the second member of the first planetary gear set is a carrier member, and the third member of the first planetary gear set is a sun gear.

7. The continuously variable transmission of claim 1 wherein the final drive unit includes a second planetary gear set having a first member, a second member, and a third member, wherein the first member is interconnected to the chain drive and the third member is fixed for rotation to a stationary member.

8. The continuously variable transmission of claim 7 wherein the first member of the second planetary gear set is a sun gear, the second member of the second planetary gear set is a carrier member, and the third member of the second planetary gear set is a ring gear.

9. The continuously variable transmission of claim 1 wherein the brake is a band brake.

10. The continuously variable transmission of claim 9 wherein the band brake, the output member, and the final drive unit are each disposed on separate, parallel axes of rotation, and wherein the transmission includes a transmission housing which cooperates with the band brake to define a space adjacent the band brake and radially inwards of the transmission housing, and wherein the chain drive is at least partially disposed within the space when the transmission is operating.

11. A continuously variable transmission comprising:
an input member;
an output member;
a first planetary gear set having first, second, and third members, wherein the first member is connected directly to the input member;
a band brake connected directly to the second member of the first planetary gear set;
a clutch interconnected between one of the first member, second member, and third member of the first planetary gear set and another one of the first member, second member, and third member of the first planetary gear set;
a belt and pulley assembly connected directly to the third member of the first planetary gear set and the output member;
a chain drive interconnected to the output member; and
a second planetary gear set having a first member, a second member, and a third member, wherein the first member is connected directly to the chain drive and the third member is fixed for rotation to a stationary member.

12. The continuously variable transmission of claim 11 further comprising a transmission housing, wherein the band brake and the transmission housing cooperate to define a space, and wherein the chain drive is at least partially disposed within the space when the transmission is operating.

13. The continuously variable transmission of claim 11 wherein engagement of the brake provides a Reverse speed ratio and engagement of the clutch provides a forward speed ratio.

14. The continuously variable transmission of claim 11 wherein the clutch is selectively engageable to connect the first member of the first planetary gear set with the second member of the first planetary gear set.

15. The continuously variable transmission of claim 11 wherein the clutch is selectively engageable to connect the first member of the first planetary gear set with the third member of the first planetary gear set.

16. The continuously variable transmission of claim 11 wherein the clutch is selectively engageable to connect the second member of the first planetary gear set with the third member of the first planetary gear set.

17. The continuously variable transmission of claim 11 wherein the first member of the first planetary gear set is a ring gear, the second member of the first planetary gear set is a carrier member, and the third member of the first planetary gear set is a sun gear.

18. The continuously variable transmission of claim 11 wherein the first member of the second planetary gear set is a sun gear, the second member of the second planetary gear set is a carrier member, and the third member of the second planetary gear set is a ring gear.

19. A continuously variable transmission comprising:
an input member;
an output member;
a first planetary gear set having a sun gear, a ring gear, and a carrier member, wherein the ring gear is connected directly to the input member;
a band brake connected directly to the carrier member of the first planetary gear set;
a clutch interconnected between one of the sun gear, ring gear, and carrier member of the first planetary gear set and another one of the sun gear, ring gear, and carrier member of the first planetary gear set;
a belt and pulley assembly connected directly to the sun gear of the first planetary gear set and the output member;
a chain drive interconnected to the output member; and
a second planetary gear set having a sun gear, ring gear, and carrier member, wherein the sun gear is connected directly to the chain drive and the ring gear is fixed for rotation to a stationary member.

20. The continuously variable transmission of claim 19 further comprising a transmission housing, wherein the band brake and the transmission housing cooperate to define a space axially adjacent the band brake, and wherein the chain drive is at least partially disposed within the space when the transmission is operating.

* * * * *